US010869005B2

(12) United States Patent
Aldover et al.

(10) Patent No.: US 10,869,005 B2
(45) Date of Patent: Dec. 15, 2020

(54) ELECTRONIC DOORBELL SYSTEM WITH REDUCED LATENCY

(71) Applicant: Arlo Technologies, Inc., Carlsbad, CA (US)

(72) Inventors: Dennis Aldover, Carlsbad, CA (US); Dnyanesh Patil, Fremont, CA (US); Velabhai Bhedaru, San Jose, CA (US); Rajinder Singh, San Jose, CA (US); Justin Maggard, Fremont, CA (US); Nisheeth Gupta, Mountain View, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/288,981

(22) Filed: Feb. 28, 2019

(65) Prior Publication Data

US 2020/0280701 A1    Sep. 3, 2020

(51) Int. Cl.
| | |
|---|---|
| H04N 7/18 | (2006.01) |
| G08B 13/19 | (2006.01) |
| H04N 21/43 | (2011.01) |
| G08B 3/10 | (2006.01) |

(52) U.S. Cl.
CPC .......... *H04N 7/186* (2013.01); *G08B 3/1016* (2013.01); *G08B 13/19* (2013.01); *H04N 21/4307* (2013.01)

(58) Field of Classification Search
None
See application file for complete search history.

(56) References Cited

U.S. PATENT DOCUMENTS

| | | | |
|---|---|---|---|
| 9,600,645 | B2 | 3/2017 | Fadell et al. |
| 9,626,841 | B2 | 4/2017 | Fadell et al. |
| 9,640,055 | B2 | 5/2017 | Fadell et al. |
| 9,652,912 | B2 | 5/2017 | Fadell et al. |
| 9,734,675 | B2 | 8/2017 | Siminoff |
| 9,894,328 | B2 | 2/2018 | Siminoff et al. |
| 9,930,300 | B2 | 3/2018 | Modestine et al. |

(Continued)

FOREIGN PATENT DOCUMENTS

| | | |
|---|---|---|
| EP | 3 337 100 | 6/2018 |
| WO | 2018183220 A1 | 10/2018 |

*Primary Examiner* — Tahla M Nawaz
(74) *Attorney, Agent, or Firm* — Boyle Fredrickson S.C.

(57) ABSTRACT

A system for electronic monitoring includes a doorbell configured to immediately call a user following the occurrence of a trigger event, such as a doorbell button push or detection of motion or sound. The system reduces latency by omitting push notifications to the user, which require the user to open an application program on a device, and instead proceeds to immediately call the user's device following the trigger event. The call can be a telephone call enabled by a wirelessly connected base station or hub making a Voice over Internet Protocol (VoIP) call to the user's mobile device. In one aspect, a video stream captured by a camera positioned separately from the doorbell (for providing an optimum viewing angle of a visitor) can be synchronized by the base station with an audio stream captured by a microphone of the doorbell for communicating a synchronized media stream near instantaneously to the user while the user returns an audio stream to the doorbell during a phone call.

18 Claims, 5 Drawing Sheets

(56) References Cited

U.S. PATENT DOCUMENTS

| | | | |
|---|---|---|---|
| 9,948,892 B2 | 4/2018 | Siminoff et al. | |
| 9,978,238 B2 | 5/2018 | Fadell et al. | |
| 9,978,254 B2 | 5/2018 | Siminoff et al. | |
| 10,075,828 B2 | 9/2018 | Horton et al. | |
| 10,447,864 B1* | 10/2019 | Rapp | G07C 9/38 |
| 2015/0156030 A1 | 6/2015 | Fadell et al. | |
| 2016/0330413 A1 | 11/2016 | Scalisi et al. | |
| 2016/0337614 A1* | 11/2016 | Siminoff | H04W 88/04 |
| 2016/0366373 A1* | 12/2016 | Siminoff | H04N 5/2257 |
| 2017/0084132 A1 | 3/2017 | Scalisi | |
| 2017/0092115 A1 | 3/2017 | Sloo et al. | |
| 2017/0323259 A1* | 11/2017 | Gillen | G06Q 50/28 |
| 2017/0323545 A1* | 11/2017 | Gillen | G06Q 50/30 |
| 2018/0041830 A1* | 2/2018 | Shahamat | H04L 12/2869 |
| 2018/0233010 A1 | 8/2018 | Modestine et al. | |
| 2018/0286201 A1 | 10/2018 | Lemberger et al. | |

\* cited by examiner

ELECTRONIC DOORBELL SYSTEM WITH REDUCED LATENCY

BACKGROUND OF THE INVENTION

1. Field of the Invention

The present invention relates to an electronic monitoring system, and more particularly, to an electronic doorbell system configured to communicate with a user with reduced latency.

2. Discussion of the Related Art

A doorbell is a signaling device typically placed near a door to a building's entrance. When a visitor presses a button, the bell rings or otherwise generates a human discernable signal inside the building, alerting the occupant to the presence of the visitor. Although the first doorbells were mechanical, activated by pulling a cord, modern doorbells are generally electric switches; and the most recent versions may contain miniature cameras, may be connected to the Internet, and may even incorporate facial recognition technology. These doorbells permit a user to monitor doorbell activation remotely via an application user-accessible device such as a computer or smartphone.

However, modern doorbells continue to suffer from several drawbacks. For example, while such doorbells can contact users through the Internet, the contact is typically in the form a push notification which requires a user to open an application to view details about the contact and possibly initiate a telephone call thereafter. This requirement for user interaction necessarily introduces substantial latency in the transmission of a video signal to the user's device.

Also, while such doorbells can contain a camera, the camera typically fails to provide optimum viewing due to the placement of the doorbell itself being in a traditional mid-height location near the door. Nor can this viewing angle be altered in any way or switched between more than one camera.

A need therefore exists for an improved doorbell system which eliminates one or more of the foregoing disadvantages.

SUMMARY OF THE INVENTION

A system for electronic monitoring is improved by a doorbell configured to immediately call a user following the occurrence of a trigger event, such as from a doorbell button push or detection of motion or sound. The system reduces latency by omitting push notifications to the user, which require the user to open an application program on a device before information can be relayed to the user. The device can comprise a processor executing a program stored in a non-transient medium to control a wireless network connection, video display and microphone, among other things. The device could be, for example, a smartphone, tablet computer, laptop computer, or the like. The system instead proceeds to immediately call the user's device following the trigger event. The call can be enabled by a wirelessly connected base station or hub making a Voice over Internet Protocol (VoIP) call to the user's device. In one aspect, a video stream captured by a camera positioned separately from the doorbell (for providing a desired, possibly user-selectable viewing angle of a visitor) can be synchronized by the base station with an audio stream captured by a microphone of or in the vicinity of the doorbell for communicating a synchronized media stream near instantaneously to the user's device while the user returns an audio stream to the doorbell during the call.

In one aspect, the invention can provide a system for establishing a secure, low-latency custom two-way audio and video call between a network-connected audio device paired with a network-connected video camera and a network-connected user accessible device such as a smartphone.

Specifically then, one aspect of the present invention can provide an electronic doorbell system, including: an electronic doorbell configured to capture an audio stream; and a hub in communication with the electronic doorbell, the hub having a processor executing a program stored in a non-transient medium operable to: detect a trigger event from the electronic doorbell; and in response to the trigger event, make a call to a user-accessible electronic. "Call" in this regard means the transmission of information to the user accessible device in a manner that permits the user to begin receiving user-discernable information directly without having to launch an application. The call could conceivably transmit purely text or purely visual information (either still or video). In the most typical example, the call will comprise a telephone call, most typically a Voice over Internet Protocol (VoIP) telephone call.

Another aspect of the present invention can provide a method for electronic monitoring, including: capturing an audio stream from an electronic doorbell; detecting a trigger event from the electronic doorbell at a hub in communication with the electronic doorbell; and in response to the trigger event, making a VoIP telephone call to an electronic device for communicating the audio stream to the electronic device.

Another aspect of the present invention can provide a system for electronic monitoring, including: an electronic doorbell arranged at a first location proximal to a door, the electronic doorbell including a button, a microphone and a speaker, the microphone being configured to capture an incoming audio stream and the speaker being configured to play an outgoing audio stream; a camera arranged at a second location distal to the first location, the camera being configured to capture a video stream; and a hub in wireless communication with the electronic doorbell and the camera, the hub having a processor executing a program stored in a non-transient medium operable to: detect a trigger event; in response to the trigger event, make a VoIP telephone call to an electronic device; synchronize the incoming audio stream from the electronic doorbell and the video stream from the camera for communicating a synchronized media stream to the electronic device during the telephone call; and play the outgoing audio stream from the electronic device to the speaker during the telephone call. The trigger event could be caused, for example, by a doorbell button push or detection of motion or sound. Such detection could come from another device in the system, such as a camera, microphone, lights or the like.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
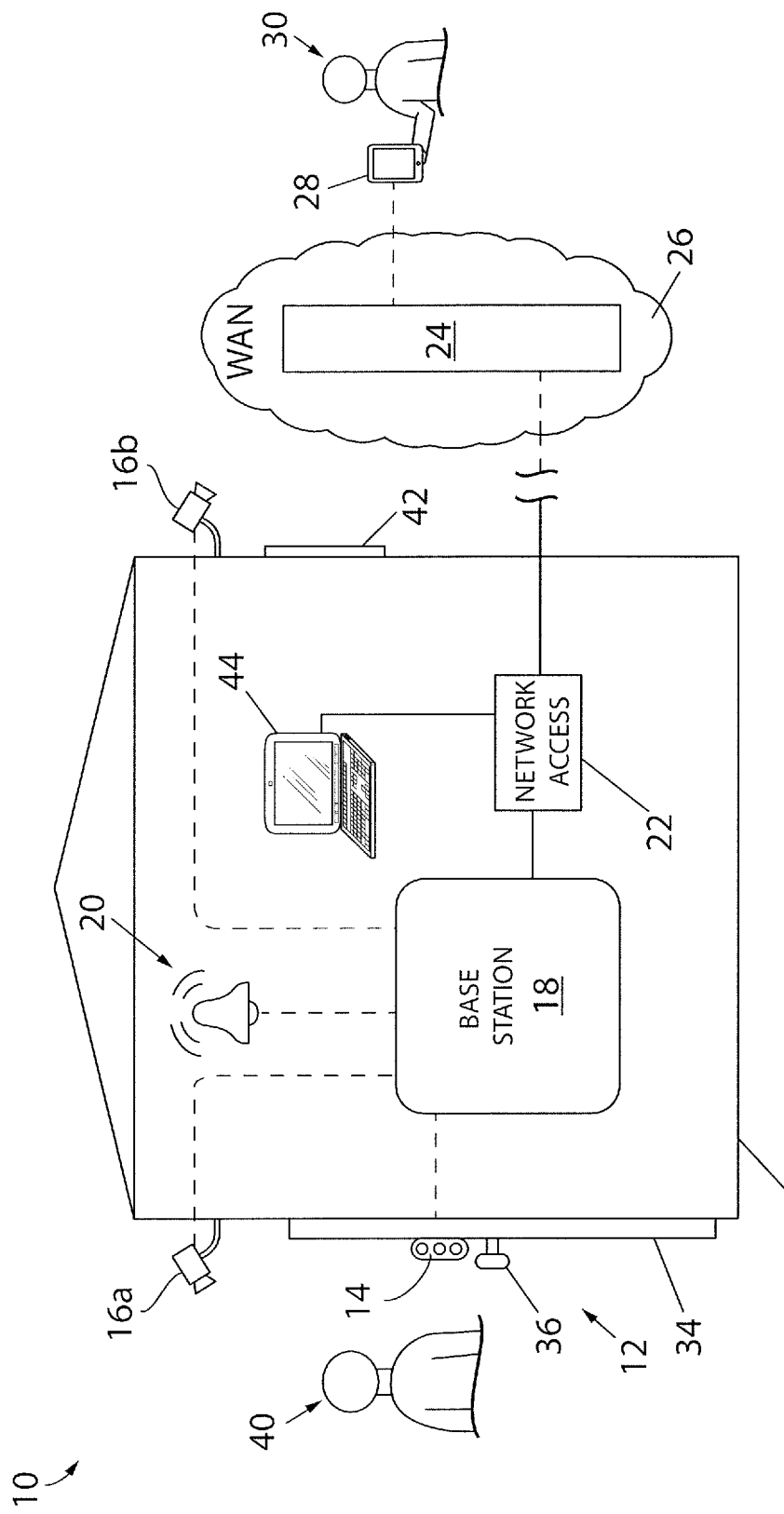
FIG. 1 is a diagram of a system for electronic monitoring which uses an electronic doorbell and base station in accordance with an aspect of the invention.

Referring now to FIG. 1, a diagram illustrating a system 10 for electronic monitoring is provided in accordance with an aspect of the invention. The system 10 can comprise an electronic doorbell system 12, including an electronic doorbell 14, one or more cameras 16, such as first and second cameras 16a and 16b, respectively, a hub or base station 18 and/or a chime 20. The base station 18 can communicate with the doorbell 14, the cameras 16 and/or the chime 20 through a wireless local network, such as an IEEE 802.11 wireless Local Area Network (LAN). The base station 18, in turn, can connect to network access equipment 22, such as modem and/or router, for communicating with a backend system 24 through a Wide Area Network (WAN) 26 such as the Internet. The backend system 24, which could comprise one or more servers, in turn, can communicate with an electronic device 28, such a smart phone, tablet computer, or laptop or desktop computer operated by a user 30.

The doorbell system 12 can be arranged with respect to a building 32, such as a home or office building. For example, the doorbell 14 can be arranged proximal to a door 34 of the building 32, in a traditional location customarily found by visitors, such as against an exterior wall or doorframe of the building 32 adjacent to the door 34 at a height just above a door knob 36. Each camera 16 can also be arranged with respect to a building 32, but advantageously at separate locations from the doorbell 14 to provide optimum viewing angles of visitor(s). For example, a first camera 16a can be arranged against the exterior wall of the building 32, several feet above the door 34, to provide an optimum angle for viewing a visitor 40 standing in front of the door. Also, a second camera 16b can be arranged against a different area of the building 32, such as several feet above a side or back window 42, distal from the first camera 16a, to provide an optimum angle for viewing any person proximal to such alternative access point. "Distal" refers to a physical separation between devices such that views and/or sounds captured by the devices far enough away from one another such that the devices are operable provide distinctly different points of observation that are useful to the user 30. As yet another example, a camera (not shown) could be mounted on a post or tree located several feet away from the building with a view of the door 34.

In addition, in one aspect, a computer 44 can be connected directly to the system, such as through the network access equipment 22, for allowing a user in the building 32 direct access to the system 12. The computer 44 could, for example, comprise a tablet, laptop, or desktop computer. This can serve as a back-up to the device 28 when the user 30 is in the building 32 for communicating over the VoIP telephone call with the visitor 40 as described herein.

A visitor 40 approaching the door 34 can cause a trigger event. Such trigger events could comprise, for example: the visitor 40 pressing or otherwise actuating a button on the doorbell 14; motion of the visitor 40 being detected by a motion sensor of the doorbell 14 and/or in a floodlight, a camera, or other device located in the vicinity of the doorbell and in communication with the base station 18; and/or a sound of the visitor 40 being detected by a microphone of the doorbell 14. Following occurrence of the trigger event, the system 12 is configured to immediately call the user 30 at a predetermined location, such as the device 28. In the most typical case in which the call is an audio form, possibly accompanied by video data, enabled by the base station 18 making a Voice over Internet Protocol (VoIP) call to the device 28. The system 12 reduces latency by omitting push notifications to the device 28, which otherwise would require the user 30 to open an application program on the device 28 before making any calls, and instead proceeds to immediately call the user's device. The remainder of the specific example contained herein assumes such a telephone call.

In one aspect, an audio stream captured by a microphone of the doorbell 14, and a video stream captured by a camera 16, such as the first camera 16a, can be synchronized by the base station 18 to communicate a synchronized media stream in near real time to the device 28. "Near real time" refers to the time delay introduced, by automated data processing and/or network transmission, between the occurrence of an event and the use of the processed data, such as for display or feedback and control purposes. For example, a near real time display depicts an event or situation as it existed at the current time minus the processing time, as nearly the time of the live event. Also, an audio stream captured by a microphone of the device 28 can be returned to the base station 18 to communicate to the doorbell 14 to allow a near real time VoIP conversation between the user 30 and the visitor 40 during a call.

Figure 2:
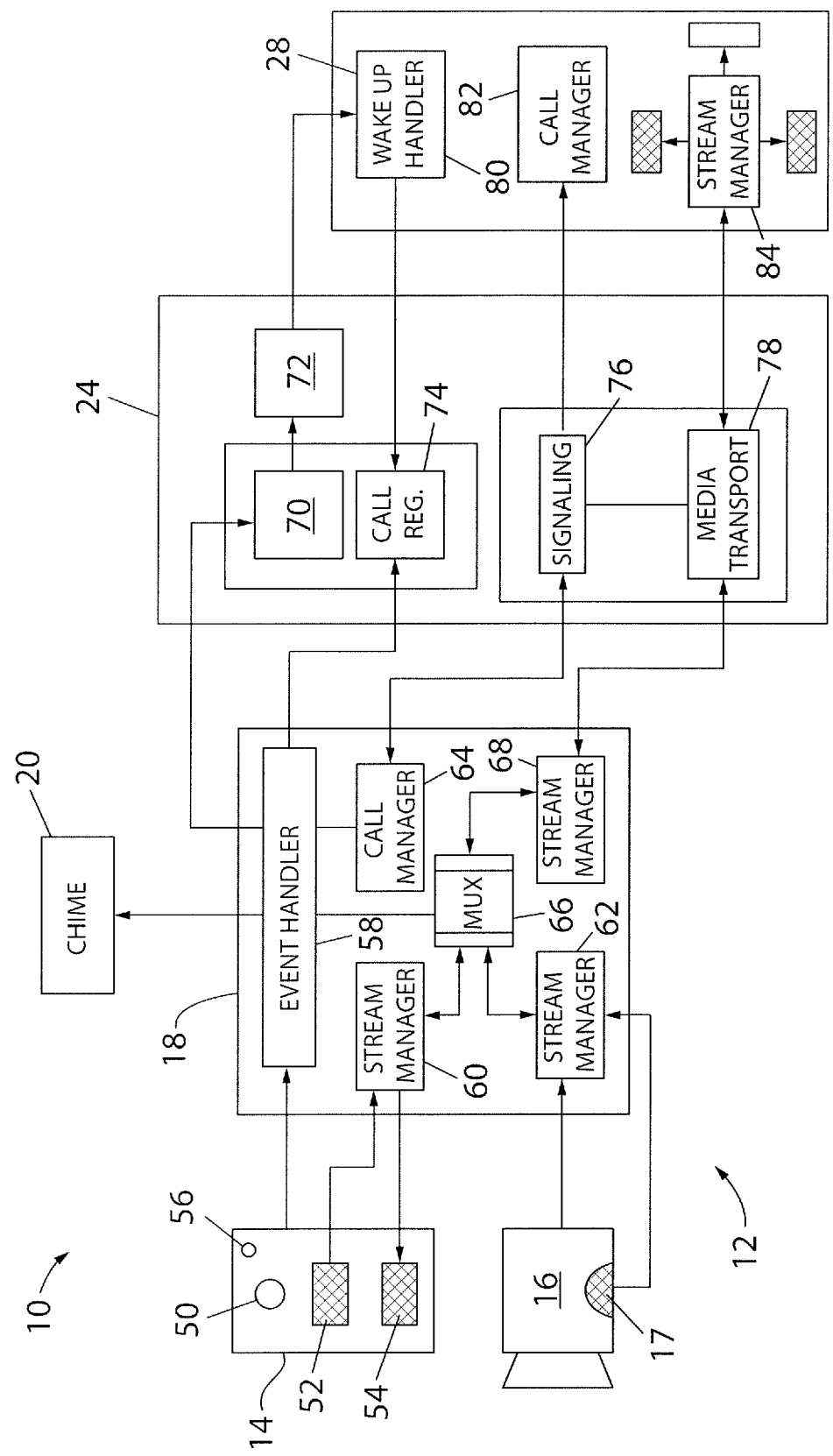
FIG. 2 is a diagram illustrating communication in the system of FIG. 1.

Referring now to FIG. 2, a diagram illustrating communication in the system 10 is provided in accordance with an aspect of the invention. The doorbell 14 can include a button 50, a microphone 52, a speaker 54 and/or a motion sensor 56. As mentioned, some of these functionalities could be provided on or duplicated on devices located apart from the doorbell. The doorbell 14 can also include processing and circuitry contained in a doorbell housing configured to be arranged proximal to the door 34. The button 50 can be a doorbell button or switch that is sensed by the base station 18 when actuated by the visitor 40. The microphone 52 can be configured to capture an incoming audio stream for communication in the system and for detection of sound (such as the voice of visitor 40). The speaker 54 can be configured to play an outgoing audio stream for communication to the visitor 40. The motion sensor 56 could be an active or passive Infrared (IR) motion sensor for detection of motion (such as by the visitor 40).

The camera 16 can include a lens, a microphone, a speaker and/or a motion sensor. The camera 16 can also include processing and circuitry contained in a camera housing configured to be arranged in diverse locations, such as against an exterior wall of the building 32 or even apart from but facing the building. The camera 16 can be configured to capture a video stream for communication in the system. The camera 16 can also be configured for detection of motion (such as from the visitor 40).

Figure 3:
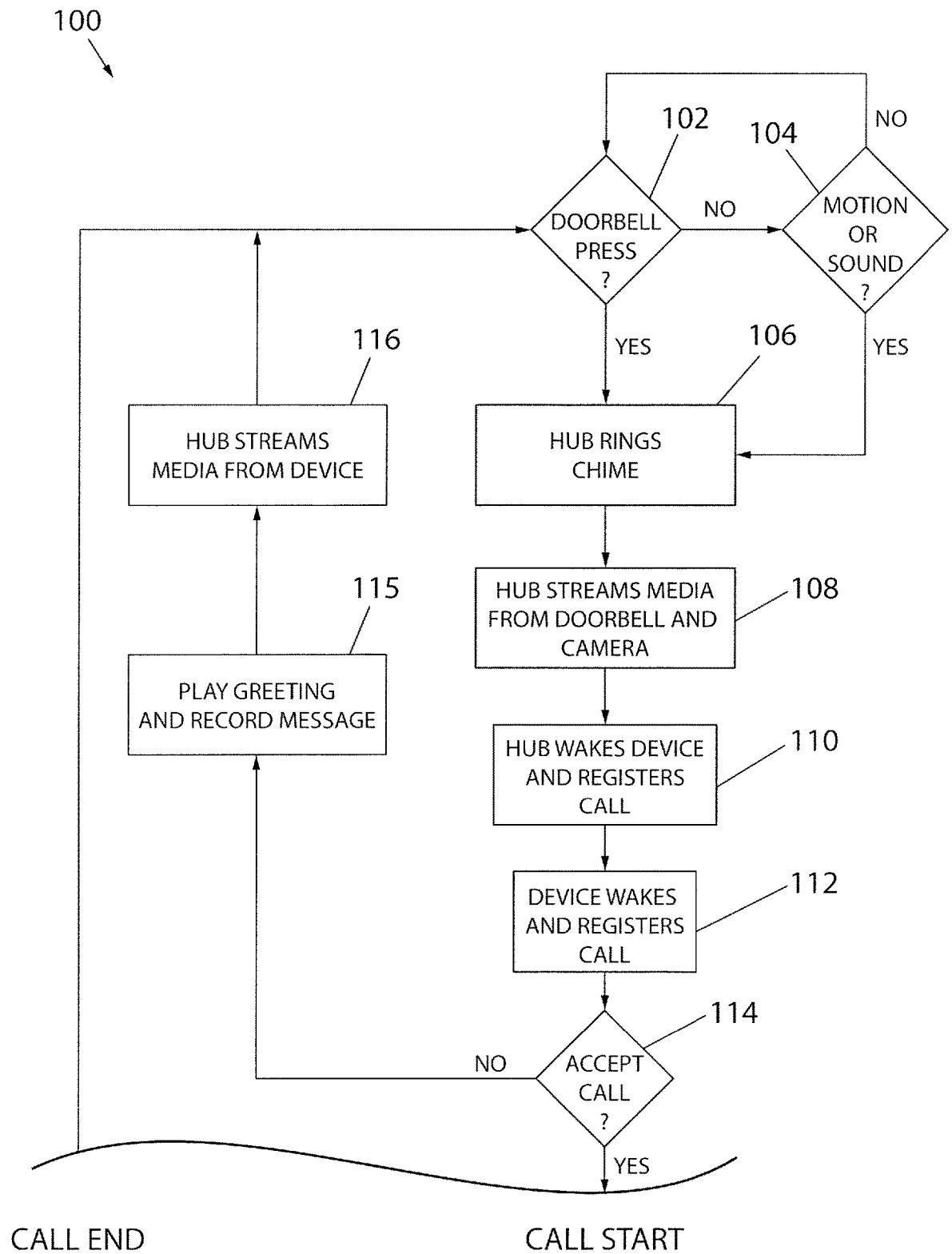
FIG. 3 is a flow chart illustrating operation for an electronic device receiving a call in the system of FIG. 1.

With additional reference to a process 100 of FIG. 3 and continued reference to the system schematic of FIG. 2, an operation for a VoIP telephone call to the device 28, triggered by the system 12, is provided in accordance with an aspect of the invention. Beginning at decision steps 102 and 104, the system 12 can monitor for a trigger event near the doorbell continuously in a loop. For example, at decision step 102, the base station 18 can monitor the button 50 of the doorbell 14 for actuation by a visitor 40. If the button 50 is not actuated or pressed ("No"), the base station 18 can proceed to decision step 104 to monitor for another triggering event such as the detection of motion and/or sound near the doorbell, such as motion detected by the motion sensor 56, sound detected by the microphone 52, and/or motion or sound detected by the camera 16. If another trigger event is not detected ("No"), the base station 18 can return to decision step 102 in a loop. However, if the button 50 is actuated or pressed at decision step 102 ("Yes"), and/or if another trigger event such as motion and/or sound is detected at decision step 104 ("Yes"), the process 100 can break the monitoring loop and proceed to step 106. Such trigger events can be detected by an event handler 58 of the base station 18.

Next, in response to the trigger event, the system 12 can proceed to take any or all of several actions near simultaneously. At step 106, the base station 18 can control the chime 20 to ring in the building 32, causing an audible alarm to alert occupants of the building 32 of the presence by the visitor 40. At step 108, the base station 18 can stream audio captured by the doorbell 14 and video captured by the camera 16 (it being understood that the camera may be any of several cameras 16a, 16b, etc. that are active at that time). In particular, an audio stream manager 60 of the base station 18 can capture the audio stream from the doorbell 14, and a video stream manager 62 of the base station 18 can capture the video stream from the camera 16, along with an audio stream from a microphone 17 of the camera 16, if the camera 16 is so equipped. A multiplexor 66 of the base station 18 can synchronize the audio stream from the audio stream manager 60 with the video stream from the video stream manager 62 for later communicating a synchronized media stream to the device 28 after communication has been established.

At step 110, the base station 18 can proceed to wake the device 28 for the call. In the case of the call being a telephone call, the base station 18 can register itself for the VoIP call, through the backend system 24. In particular, the base station 18 can wake the device 28 for the telephone call by the event handler 58 contacting a system events service 70 of the backend system 24. The event handler 58 can request, through the system events service 70, an endpoint for making the call. The system events service 70, in turn, can send a wake-up notification to a notify service 72. The notify service 72, in turn, can send the wake-up notification to a wake-up handler 80 executing on the device 28. Also, the base station 18 can register for the call through the backend system 24 by the event handler 58 contacting a call registration service 74.

At step 112, the device 28 can wake via the wake-up handler 80. Also, the device 28 can register to receive the VoIP call through the backend system 24. With the call registered at each endpoint, a call manager 64 of the base station 18 can send a call invite to the device 28 through a signaling service 76. The signaling service 76 can provide Session Initiation Protocol (SIP) signaling for initiating, maintaining, and terminating real-time sessions that include voice, video and messaging applications between the system 12 and the device 28. A call manager 82 of the device 28, in turn, can receive the invitation. This can appear to the user 30 as the device 28 spontaneously waking and ringing with an immediate incoming phone call with a caller identification (Caller ID) indicating the system 12 as being the caller.

At decision step 114, the user 30 can choose to accept or decline the call, such as by tapping an appropriate selection on a touchscreen of the device 28, like other incoming phone calls. If the user chooses to decline the call ("No"), the process 100 can proceed to step 115 in which the base station 18, being operable to detect a failure of the electronic device to answer the call, controls the doorbell 14 to play a predetermined greeting and record a voice message with a defined start and stop from the visitor 40 in response to the greeting. For example, the doorbell 14 may relay "I cannot come to the door right now." The voice message, in turn, can be sent by the base station 18 to device 28. In other words, if at decision step 114 the user declines the call ("No"), then a SIP call is not initiated between the doorbell 14 (through the base station 18) and the device 28. Instead, a prerecorded audio message can be played at the doorbell 14, such as: "We are not able to come to the door right now. Please leave a message."

In addition, in the process 100, at step 116, a loaded application program executing on the device 28 can receive the synchronized media stream to the device 28. In particular, a hub stream manager 68 of the base station 18 can send the synchronized media stream from the multiplexor 66 ("mux") to a media transport tunneling service 78 of the backend system 24. The media transport tunneling service 78 can provide Real Time Streaming Protocol (RTSP) signaling to control the media stream as Real-time Transport Protocol (RTP) packets between the base station 18 and the device 28. An application stream manager 84 of the device 28, executing as part of the application program, can receive the media stream. The user 30 can open the application program on the device 28 to see and hear the media stream in real time through the application program. Alternatively, the user 30 can place the device 28 back into sleep with the possibility of returning to the application program later for viewing the media stream as a recorded event.

Figure 4:
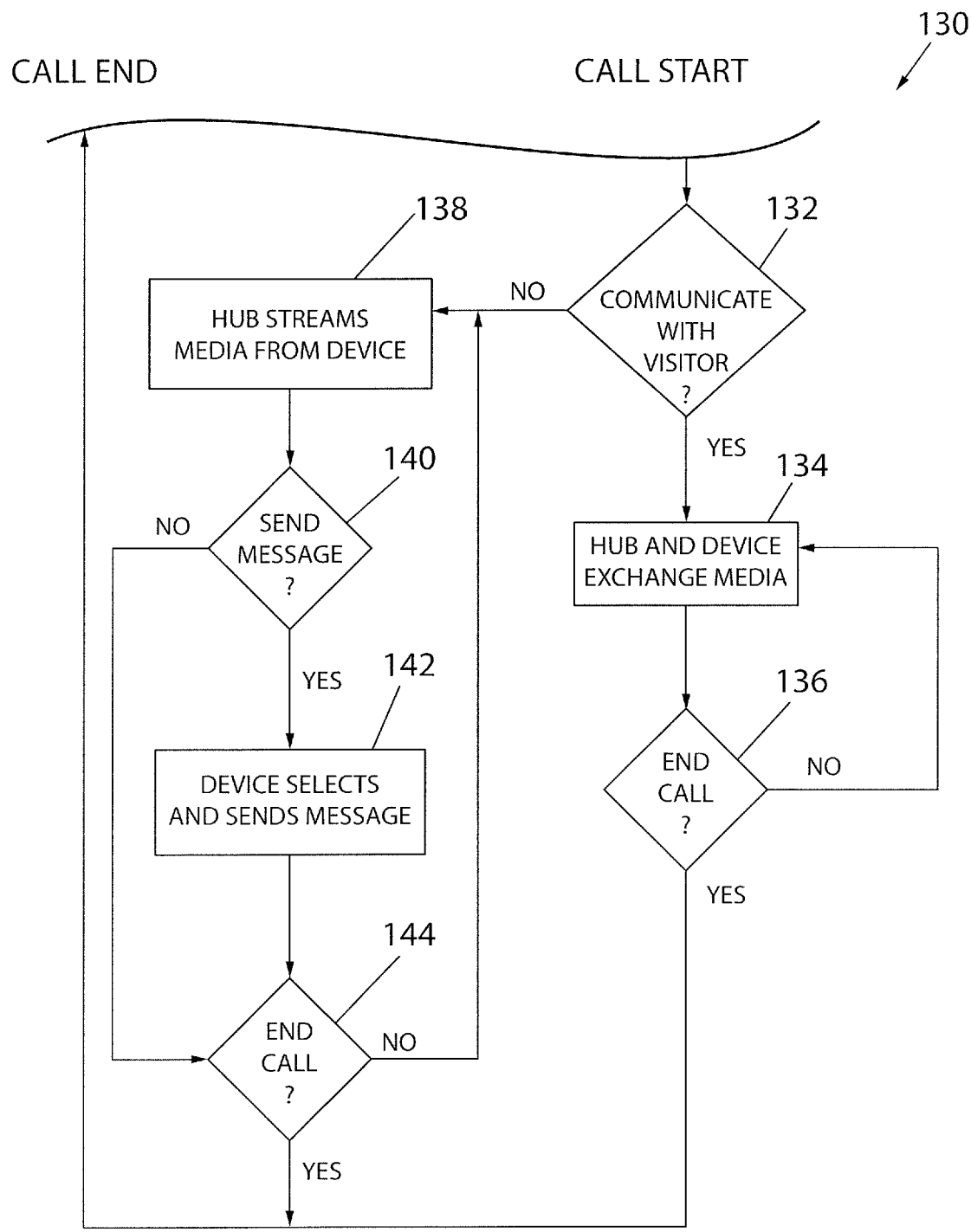
FIG. 4 is a flow chart illustrating operation for an electronic device communicating with the doorbell during a call in the system of FIG. 1.

However, returning to decision step 114, and with additional reference to FIG. 4, if the user chooses to accept the call ("Yes"), the process 100 can proceed to a telephone call routine ("Call Start") at process 130. In other words, if at decision step 114 the user accepts the call ("Yes"), then a SIP call is initiated between the doorbell 14 (through the base station 18) and the device 28. By default, the microphone of the device 28 can be muted. At decision step 132, after accepting the call, the user 30 can choose whether to communicate directly or indirectly with the visitor 40, such as by tapping another selection on the touchscreen of the device 28. If the user chooses to communicate directly with the visitor ("Yes"), such as for a more traditional phone call, the process 130 can proceed to step 134 in which the microphone of the device 28 is unmuted, and the base station 18 and the device 28 exchange bi-directional media streams in a VoIP call that is near real time. In one aspect, the exchange of bi-directional media streams can comprise outgoing video and audio streams from the system 12 (and the doorbell 18) to the device 28, and only an incoming audio stream from the device 28 to the system 12. However, in another aspect, the doorbell 14 can be configured with a display, and the exchange of bi-directional media streams can comprise outgoing video and audio streams from the system 12 (and the doorbell 18) to the device 28, and incoming video and audio streams from the device 28 to the system 12. The process can then proceed to decision step 136 in which the user 30 can choose to end the call at any time. If the user 30 does not end the call ("No"), the process can return to step 134 in which the base station 18 and the device 28 continue to exchange bi-directional media streams. In other words, the SIP session stays active until the user 30 ends the call via the device 28. However, if the user 30 does end the call ("Yes"), the process can return to the process 100 of FIG. 3 ("Call End"), returning to decision steps 102 and 104, monitoring for another trigger event.

However, returning to decision step 132 of FIG. 4 as well as the system diagram of FIG. 2, after accepting the call, the user 30 can also choose to communicate indirectly with the visitor 40. If the user 30 chooses to communicate indirectly with the visitor 40 ("No"), the process 130 can proceed instead to step 138 in which the microphone of the device 28 continues to be muted, and the device 28 proceeds to receive the synchronized media stream from the base station 18. Despite inhibiting audio from the device 28, the user 30 of the device 28 can still listen/view the media stream from the doorbell 14. In addition, at decision step 140, the user 30 can at any time decide whether to send a message to play at the doorbell 14. The user 30 can type or dictate a custom message, and/or select any of multiple predetermined messages, including messages pre-recorded by the user 30 and/or "stock" messages selectable by the user from a pre-programmed list, for playing to the speaker 54 of the doorbell 14. One exemplar message could be: "Please leave your package by the door." Another exemplar message could be: "Sorry I cannot come to the door right now. Please contact me later." If the user 30 decides to send a predetermined message ("Yes"), the process can proceed to step 142 in which the user 30 selects the message at the device 28 for the base station 18 to play at the doorbell 14. However, if the user 30 decides not to send a predetermined message ("No"), the process can bypass step 142 and proceed to decision step 144 for ending the call at any time. If the user 30 does not end the call ("No"), the process can return to step 138, continuing to receive at the device 28 the synchronized media stream from the base station 18, in a loop. In other words, the SIP session stays active until the user 30 ends the call via the device 28. In addition, during the call, the user 30 can continue to send messages to be played at the doorbell 14. Also, at any time during the call, the user 30 can unmute the microphone of the device 28 and start talking to the visitor, with an exchange of bi-directional media streams between the base station 18 and the device 28. However, if the user 30 does end the call ("Yes"), the process can return to the process 100 of FIG. 3 ("Call End"), returning to decision steps 102 and 104, monitoring for another trigger event.

Figure 5:
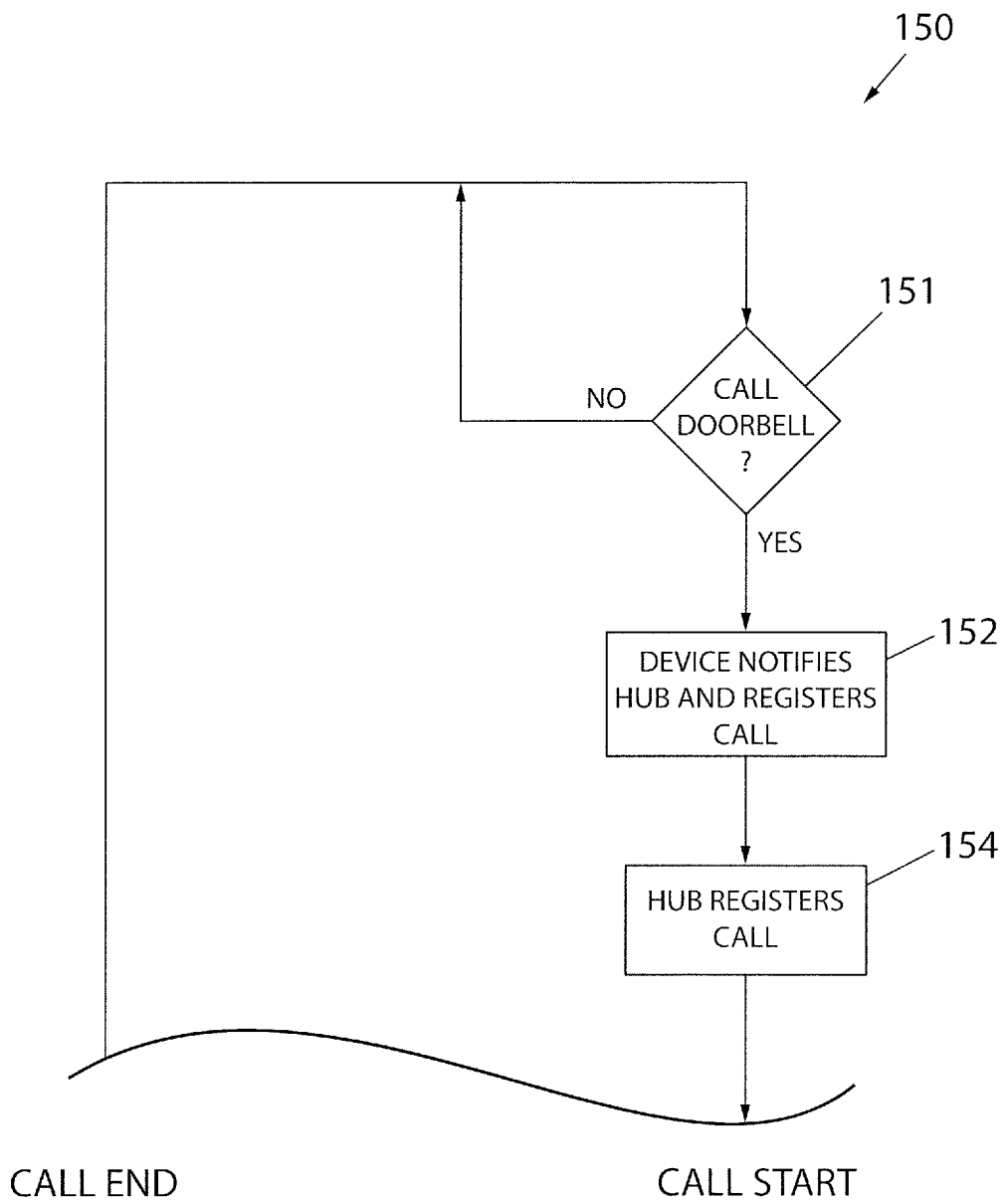
FIG. 5 is a flow chart illustrating operation for an electronic device making a call in the system of FIG. 1.

With additional reference FIGS. 2 and 5, in another aspect of the invention, the user 30 can control the device 28 to make a VoIP telephone call without waiting for a trigger event. Beginning at decision step 151, the user 30 can choose whether to call the doorbell 14 from the device 28. If the user 30 chooses not to call the doorbell 14 ("No"), the process 150 goes no further. However, if the user 30 does choose to call the doorbell 14 ("Yes"), the process 150 can proceed to step 152 in which the device 28 can register itself for a VoIP call and notify the base station 18. In particular, the device 28 can register for the call by contacting the call registration service 74 of the backend system 24. Also, the device 28 can notify the base station 18 to receive the call by contacting the system events service 70 of the backend system 24 which, in turn, contacts the event handler 58. At step 154, the base station 18 can register for the call by the event handler 58 contacting the call registration service 74. With the call registered at each endpoint, the call manager 82 of the device 28 can send a call invitation to the base station 18 through the signaling service 76. The call manager 64 of the base station 18, in turn, can receive the invite and automatically accept the call. With additional reference to FIG. 4, with the VoIP call connected, the process 150 can proceed to the telephone call routine ("Call Start") at process 130 as described above.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic doorbell system, comprising:
   a camera configured to capture a video stream;
   an electronic doorbell configured to capture an audio stream; and
   a hub in communication with the camera and the electronic doorbell, the hub having a processor executing a program stored in a non-transient medium operable to:
   detect a trigger event;
   in response to the trigger event, call to an electronic device for communicating user-discernable information to the electronic device;
   select between direct and indirect communications for the call in which direct communication allows bi-directional exchange of audio streams and indirect communication allows only one direction of audio stream from the electronic doorbell to the electronic device; and
   synchronize the video stream from the camera and the audio stream from the electronic doorbell for communicating a synchronized media stream to the electronic device in either the direct or indirect communication,
   wherein the call minimizes latency by ringing the electronic device with an immediate incoming phone call while omitting push notifications which require an application program to be opened on the electronic device for the call.

2. The system of claim 1, wherein the call is a Voice over Internet Protocol (VoIP) telephone call and the user discernable information is an audio stream.

3. The system of claim 2, wherein the electronic doorbell comprises a microphone and a speaker, wherein the audio stream is captured by the microphone, and wherein an audio stream from the electronic device is played by the speaker.

4. The system of claim 1, wherein the electronic doorbell is contained in a doorbell housing configured to be arranged at a first location proximal to a door, and wherein the camera is contained in a camera housing configured to be arranged at a second location distal to the first location.

5. The system of claim 4, wherein the hub is in wireless communication with the camera and the electronic doorbell through a Local Area Network (LAN).

6. The system of claim 1, wherein the electronic doorbell comprises a button, and wherein the trigger event comprises actuation of the button.

7. The system of claim 1, wherein the electronic doorbell comprises an Infrared (IR) motion sensor, and wherein the trigger event comprises motion detection through the IR motion sensor.

8. The system of claim 1, wherein the electronic doorbell comprises a microphone, and wherein the trigger event comprises sound detection through the microphone.

9. The system of claim 1, wherein the electronic device is a smart phone, a tablet computer, a laptop computer, or a desktop computer.

10. The system of claim 1, wherein the hub is operable to detect a failure of the electronic device to answer the telephone call, and upon detecting the failure, to control the electronic doorbell to play a predetermined greeting.

11. The system of claim 10, wherein the hub is operable to control the electronic doorbell to record a voice message in response to the predetermined greeting and to send the voice message to the electronic device.

12. The system of claim 1, wherein indirect communication is selected and the telephone call inhibits audio from the electronic device, and wherein the hub is operable to control the electronic doorbell to play a predetermined message selected from among a plurality of predetermined messages by the electronic device.

13. A method for electronic monitoring, comprising:
capturing a video stream from a camera;
capturing an audio stream from an electronic doorbell;
detecting a trigger event from the electronic doorbell at a hub in communication with the camera and the electronic doorbell;
in response to the trigger event, making a VoIP telephone call to an electronic device for communicating the audio stream to the electronic device; and
selecting between direct and indirect communications for the call in which direct communication allows bi-directional exchange of audio streams and indirect communication allows only one direction of audio stream from the electronic doorbell to the electronic device; and
synchronizing the video stream from the camera and the audio stream from the electronic doorbell for communicating a synchronized media stream to the electronic device in either the direct or indirect communication,
wherein the telephone call minimizes latency by ringing the electronic device with an immediate incoming telephone call while omitting push notifications which require an application program to be opened on the electronic device for the telephone call.

14. The method of claim 13, further comprising capturing the audio stream from a microphone of the electronic doorbell and playing an audio stream from the electronic device to a speaker of the electronic doorbell.

15. The method of claim 13, further comprising detecting a failure of the electronic device to answer the telephone call, and upon detecting the failure, controlling the electronic doorbell to play a predetermined greeting.

16. The method of claim 15, further comprising controlling the electronic doorbell to record a voice message in response to the predetermined greeting and sending the voice message to the electronic device.

17. The method of claim 13, further comprising selecting indirect communication and inhibiting audio from the electronic device in the telephone call and controlling the electronic doorbell to play a predetermined message selected from among a plurality of predetermined messages by the electronic device.

18. A system for electronic monitoring, comprising:
an electronic doorbell arranged at a first location proximal to a door, the electronic doorbell comprising a button, a microphone and a speaker, the microphone being configured to capture an incoming audio stream and the speaker being configured to play an outgoing audio stream;
a camera arranged at a second location distal to the first location, the camera being configured to capture a video stream; and
a hub in wireless communication with the electronic doorbell and the camera, the hub having a processor executing a program stored in a non-transient medium operable to:
detect a trigger event from the electronic doorbell;
in response to the trigger event, call to an electronic device for communicating user-discernable information to the electronic device; and
select between direct and indirect communications for the call in which direct communication allows bi-directional exchange of audio streams and indirect communication allows only one direction of audio stream from the electronic doorbell to the electronic device,
wherein the call minimizes latency by ringing the electronic device with an immediate incoming phone call while omitting push notifications which require an application program to be opened on the electronic device for the call;
synchronize the incoming audio stream from the electronic doorbell and the video stream from the camera for communicating a synchronized media stream to the electronic device in either the direct or indirect communication during the telephone call; and
play the outgoing audio stream from the electronic device to the speaker during the telephone call.

* * * * *